United States Patent Office 3,507,367
Patented Apr. 21, 1970

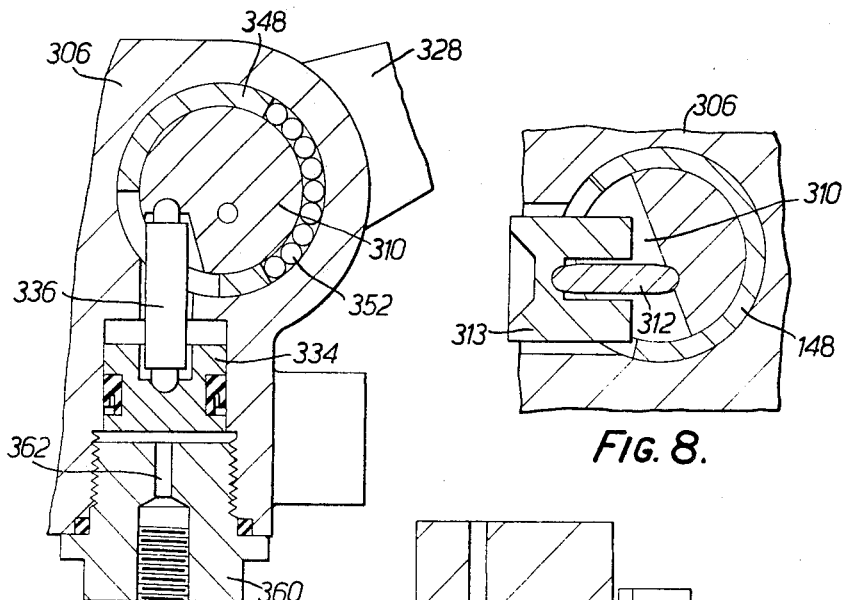
FIG. 7.
FIG. 8.
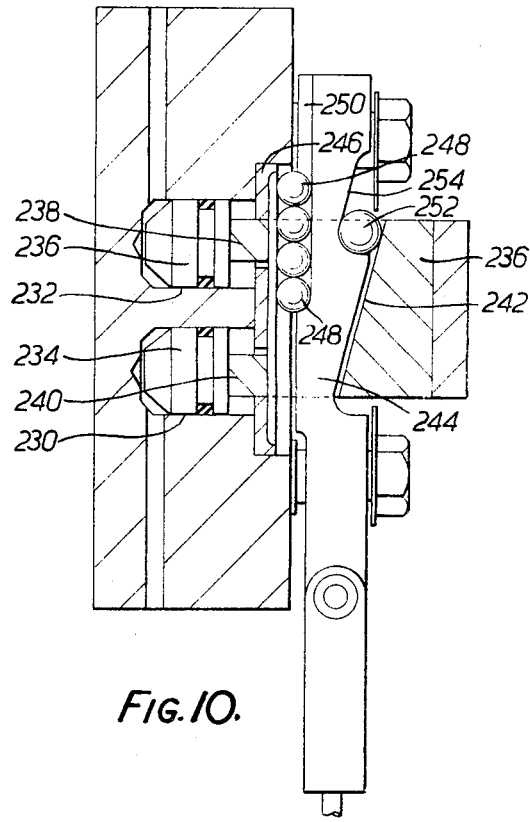
FIG. 10.

3,507,367
DISC BRAKE WITH MULTIPLE OPERATORS
Peter William Brown and Glyn Phillip Reginald Farr,
Tyseley, England, assignors to Girling Limited
Filed Aug. 12, 1968, Ser. No. 752,011
Claims priority, application Great Britain, Aug. 15, 1967,
37,395/67
Int. Cl. F16d 65/14
U.S. Cl. 188—106                    8 Claims

ABSTRACT OF THE DISCLOSURE

The invention resides in a disc brake having a reaction structure such as a caliper or a sliding yoke carrying a fixed pad and a movable pad which is directly actuated by hydraulic means acting through a thrust transmitting assembly of adjustable length, and wherein the hydraulic means comprises separately actuating pistons. Preferably, thurst is transferred from the pistons to the said assembly by a rotary cam, and the pistons are at the same distance as each other from the axis of rotation of the cam. The cam may also carry an actuating lever of a handbrake linkage.

---

This invention relates to disc brakes of a construction which includes a pair of opposed pads, one of which is applied directly by an actuating mechanism and the other is applied indirectly, by reaction.

In accordance with the invention, there is provided a disc brake including a pair of opposed pads of which one is directly applied by an actuating mechanism and the other is indirectly applied by reaction, and the said mechanism includes two pistons which are hydraulically operable independently of each other and a thrust transmitting assembly of adjustable length for transmitting thrust from either or both of said pistons to the directly applied pad.

The invention further provides a disc brake including a pair of opposed pads of which one is directly applied by an actuating mechanism and the other is indirectly applied by reaction, and the said mechanism comprises a rotatable cam, a thrust transmitting assembly of adjustable length acting between the cam and the directly applied pad, and two pistons hydraulically operable independently of each other for rotation of the cam.

This arrangement is particularly advantageous in making possible the design of a simple and reasonably compact disc brake having provision for dual hydraulic actuation and automatic adjustment to compensate for excess wear of the brake pads.

Further features and advantages of the invention will appear from the following description of some embodiments thereof, given by way of example only, reference being had to the accompanying drawings, in which:

FIGURES 7 and 8 are partial views in section along the lines VII—VII and VIII—VIII of FIGURE 6;

FIGURE 10 is a section along the line X—X of FIGURE 9.

Figure 1:
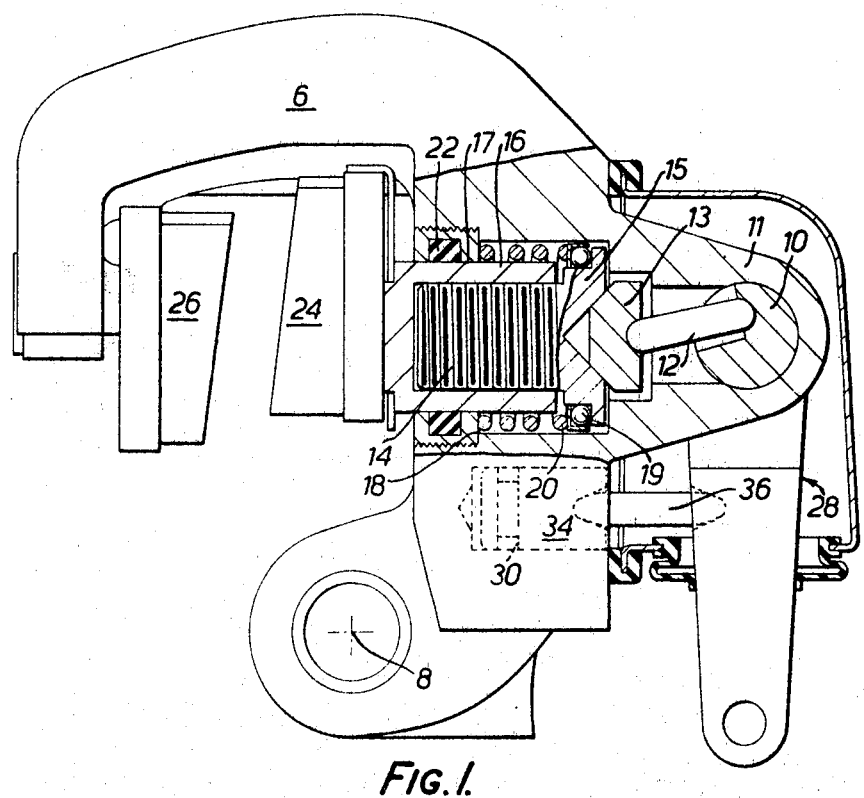
FIGURE 1 is a part sectioned side elevation of one form of brake actuating mechanism for a disc brake.
Figure 2:
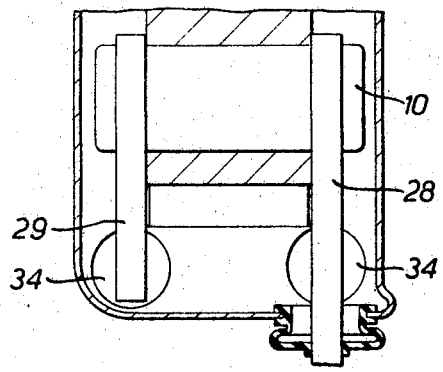
FIGURE 2 is a plan view, partly in section, of certain components of the brake actuating mechanism of FIGURE 1.

The brake illustrated in FIGURES 1 and 2 comprises a caliper body 6 member located on one side of and straddling a minor portion of the periphery of a rotatable disc (not shown). The caliper is adapted to be mounted on a fixed part of a vehicle so as to be non-rotatable with respect to direction of disc rotation, but movable about a pivot 8 in the direction of the disc axis. A pair of friction pad assemblies 24 and 26 located in the caliper member are located in opposed relationship one on either side of the disc, the pad 24 being directly urged towards the disc by brake actuating mechanism whilst the pad 26 is applied to the disc by reaction, upon movement of the caliper about the pivot 8.

The actuation mechanism illustrated in FIGURES 1 and 2 comprises a cam shaft 10 rotatably mounted in a housing 11 forming part of the main caliper body. The cam 10 acts on the directly applied pad 24 through a force transmitting assembly comprising a dolly 12 which is non-rotatably mounted with the cam and which likewise abuts an intermediate member 13 having at its forward end a frusto-conical face for engagement with a complementary seat on a spindle 14 having a flange 15 at its rear end and externally threaded at the forward end for engagement with a nut 16. The nut is slidable through the small diameter portion 17 of a stepped bore in a caliper, and a coil spring 20 located within the bore acts between a shoulder 18 and, through a thrust bearing 19, the flange 15 of the spindle, to urge the whole mechanism to its rest position. A friction ring 22 prevents rotation of the nut and resists the passage of the nut 16 through the bore 17. The screwthreaded connection between the spindle 14 and the nut 16 enables the effective length of the assembly to be automatically varied as required due to wear of the pad by relative rotation of the nut and the spindle.

The screwthread is formed to provide a small clearance between the threads to cater for pad swell in an axial direction due to heat, and is also coated with a material of low coefficient of friction such as P.T.F.E. to effect relative rotation of the nut and spindle when they are under an axial load and in the absence of a torque to oppose rotation of the spindle.

When the cam 10 is rotated to apply the pad 24 directly and the pad 26 by reaction through the caliper body, the force transmitting assembly moves to the left to compress the spring 20, but rotation of the spindle 14 is prevented by the torque due to friction at the frusto-conical interface between the spindle 14 and the member 13. Assuming adjustment is required, when the brake is released the nut moves to the right through the friction ring 22 by an amount equal to the deflection in the caliper and thereafter the ring 22 holds the nut 16 against axial movement, with the result that the spindle will move axially by an amount equal to the predetermined thread clearance and thereafter rotate to increase the length of the assembly, since the torque at the frusto-conical interface is lower than the torque at the screwthread.

The screwthread on the spindle and/or the nut preferably is coated on both faces of the thread with a material such as P.T.F.E. Alternatively, one thread face only of the spindle and/or nut may be coated on the co-acting thread surfaces which are engaged when the assembly is loaded in tension.

The actuating mechanism comprises a lever 28 mounted at one end directly on the cam 10 the other end of the lever being adapted for connection with the brake linkage (not shown) of the hand brake lever. The cam projects from either side of its bore and one projection has the lever 28 hot riveted thereto. The other projection carries a second lever 29. A pair of circumferentially spaced and rearwardly facing cylinders 30 and 32 in the caliper body aligned with the levers 28 and 29 each houses hydraulic pistons 34 which act on the lever 28 through dolly members 36. Each of these dolly members can rock so as to maintain rolling contact with the piston and cam, respectively.

The cylinders 30 and 32 are fed from separate hydraulic lines, so that the pistons are independently operable and failure of one line does not prevent service brake operation.

Figure 3:
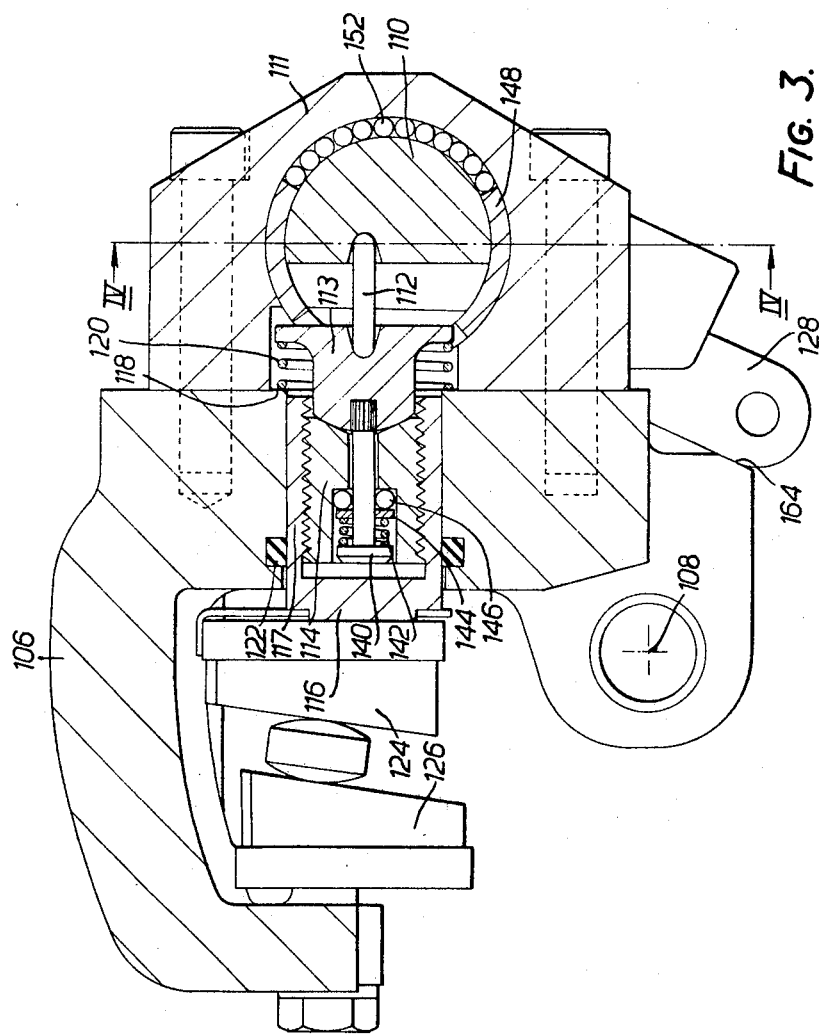
FIGURE 3 is a sectioned side elevation of another form of brake actuating mechanism for a disc brake.
Figure 4:
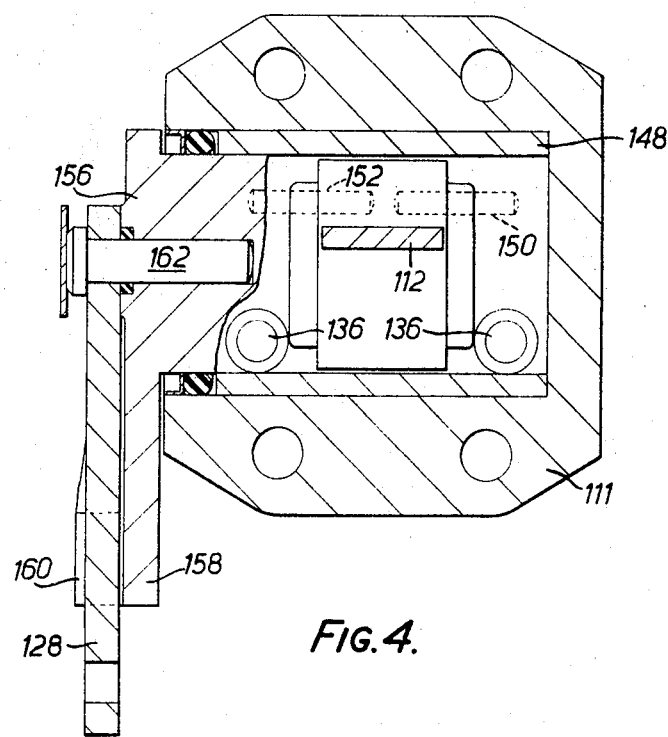
FIGURE 4 is a section along the line IV—IV of FIGURE 3.
Figure 5:
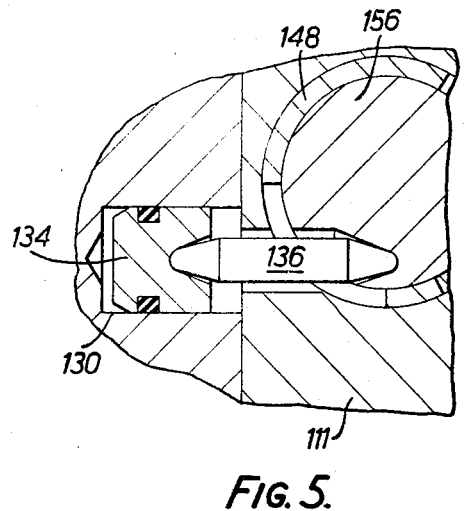
FIGURE 5 is a scrap section showing details of certain components of the brake actuating mechanism of FIGURES 3 and 4.

The automatic adjuster in FIGURES 3 to 5 functions in the same way as the previous example but is slightly different in structure. Parts in the adjuster which are equivalent to those used in the mechanism of FIGURES 1 and 2 are designated by similar reference numerals but with 100 added to them. Thus, cam "10" of FIGURES 1 and 2 is designated "110" in FIGURES 3 to 5. The coil spring 120 now acts on the intermediate member 113, the latter having a forwardly extending headed rod 140 against which a spring 142 acts through a washer 144 and balls 146 to urge the spindle 114 against the member 113 and is of insufficient power to draw the nut 116 through the friction ring 122 during brake release.

The cam 110 is formed on a cam shaft 156 which is journalled in a bore in the housing 111 by a cage 148 incorporating two sets of spaced needle rollers 150 and 152 along the axis of the cam shaft. At one end of the shaft is an arm 158 provided with lug 160 which under the action of spring 120 normally abuts the mechanical lever 128 which is mounted on the shaft for angular movement on a pin 162 and which normally engages a fixed abutment 164 on the caliper body.

A pair of hydraulic cylinders circumferentially spaced one to either side of the cam 110 each have working pistons which act through dollies 136 directly on the cam shaft 156. The dollies pass through an opening or openings in the cage 148.

Figure 6:
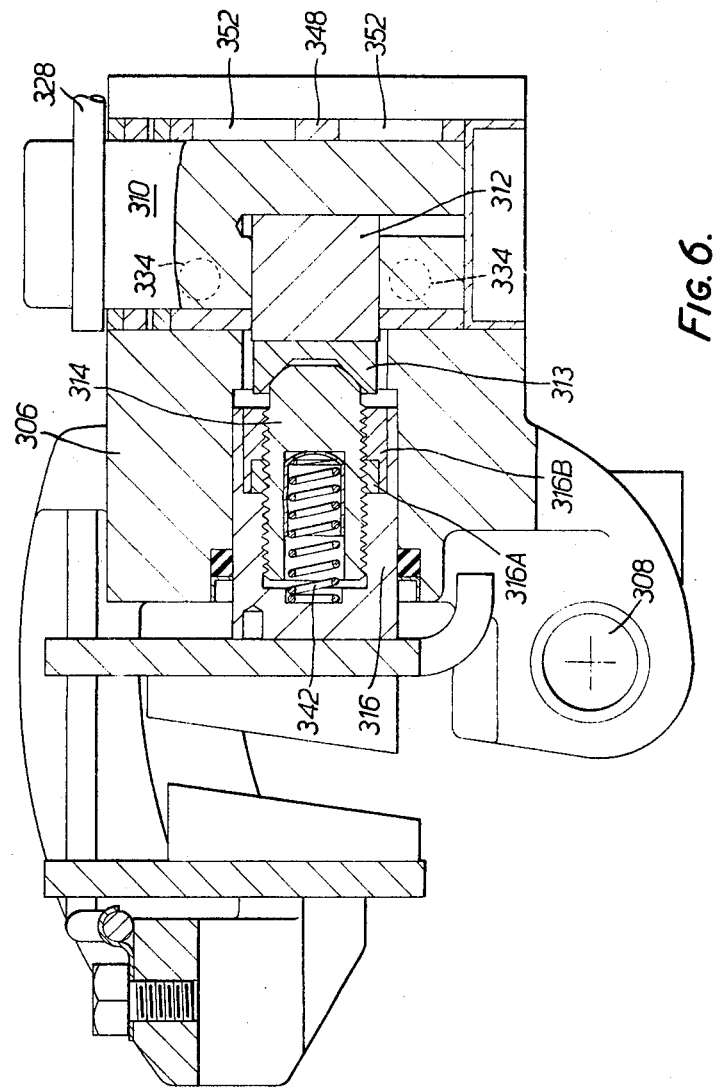
FIGURE 6 is a sectional side elevation of a third form of brake.

In FIGURES 6 to 8, parts corresponding to parts of FIGURES 1 and 2 have the same reference numerals with 300 added to them.

In the brake shown in FIGURES 6 to 8, the cam member 310 is arranged in a bore through the caliper body 306, and is arranged to extend transverse to, but offset from the pivot axis 308, and the twin actuating pistons 334 are correspondingly arranged to transversely to the line of action of the thrust transmitting assembly. These modifications bring with them the advantages that: when the brake is mounted on a vehicle with the pivot axis 308 extending horizontally in the fore and aft direction of the vehicle, the cam is vertical and the handbrake lever 328 can be operated by a pull in the fore and aft direction; all the parts are contained in a single housing formed by the caliper body, thus cutting down the number of parts required and facilitating arrangement of the hydraulic parts required.

As shown in FIGURE 7, each piston 334 acts, as before, through a dolly member 312. The piston chamber 330 is closed by a plug 360 which also provides a pressure port 362. Access to the piston for servicing therefore requires only removal of the plug 362, without dismantling any other parts of the brake structure.

The thrust transmitting assembly is shown in FIGURES 6 and 8. As before, it comprises a dolly member 312, a tappet 313 and a threaded spindle 314. In this embodiment, the nut is formed as a cup 316 having two threaded inserts 316A and 316B pressed into it. Insert 316A is of a low-frictional material such as P.T.F.E., and insert 316B is of metal. Clearance is provided between the thread on the inserts and that on the spindle 314, so that upon brake actuation, thrust is transmitted to the cup 316 through the metal insert 316B, wih high frictional loading due to metal-to-metal contact between the threads of the spindle and insert. When the brake is released and the cam shaft 310 returns to its rest position, and a clearance develops between the frusto-conical surfaces of the tappet 313 and spindle 314. This clearance is taken up by the action of spring 342, which first takes up the thread clearance to bring the spindle threads into contact with the threads of the insert 316A, whereafter the spindle turns by reaction against those threads until the remainder of the clearance between 313 and 314 is taken up and the frusto-conical surfaces on those parts re-establish frictional engagement.

Figure 9:
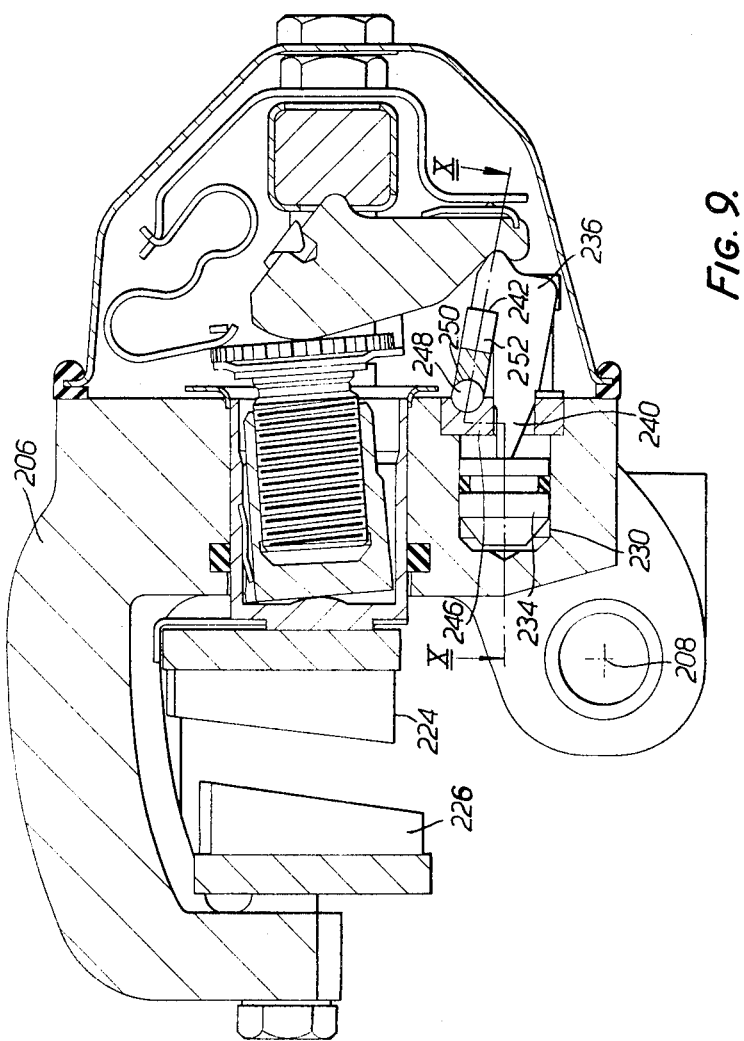
FIGURE 9 is a sectioned side elevation of a further form of brake actuating mechanism for a disc brake.

The actuating mechanism of FIGURES 9 and 10 is one which requires very little modification of the brake being the subject of British Patent 1,029,945, the only re-design being in the mechanical hand brake actuation in consequence to incorporating twin hydraulic piston and cylinders. Parts corresponding with parts of FIGURES 1 and 2 have the same reference numerals with 200 added to them.

Both pistons 234 working in cylinders 230 and 232 respectively act on a common tappet 236 having at one end a pair of legs 238 and 240 which abut the pistons and a stepped up portion at the other end; the shoulder 242 formed by the step is inclined with respect to the sides of the tappet. A wedge piece 244 is positioned alongside but transverse to the tappet 236 and between the shoulder 242 and a plate 246 which is fixed to the caliper body.

A series of balls 248 in a circular groove 250 along one edge of the wedge piece permit efficient wedge movement over the plate 246 when the system is under load. A roller bearing 252 is positioned between the inclined shoulder 242 on the tappet 236 and a similarly inclined edge 254 on the wedge piece and is normally located at one end of the surface 242 whereby a pull in the direction of the axis of the wedge piece, displaces the tappet to move the rocking lever angularly in the brake applying direction.

Whilst the invention has been described in conjunction with a swinging caliper disc brake it will be understood that the invention is equally applicable to sliding caliper or yoke disc brakes, and that it is not limited to a brake which is both hydraulically and mechanically activated.

We claim:
1. A disc brake comprising a reaction structure, a first friction pad securely mounted on said structure, an opposing pad movably mounted on said structure for movement towards and away from said first pad, a pair of pistons hydraulically operable independently of each other, a thrust transmitting assembly of adjustable length adapted to transfer thrust from either of said pistons to said second pad, a rockable lever fulcrumed against said reaction structure for transferring thrust to said thrust transmitting assembly, a single tappet for transmitting thrust from said pistons to said lever, and hand brake actuating means also operable to transmit thrust through said tappet to said rockable lever.

2. A disc brake comprising a reaction structure, a first friction pad securely mounted on said structure, an opposing pad movably mounted on said structure for movement towards and away from said first pad, a pair of pistons hydraulically operable independently of each other, a thrust transmitting assembly of adjustable length operably engaging said second pad, a rotary shaft operably connected to said thrust transmitting member and to said pistons for transmitting thrust from either of said pistons to said second pad through said thrust transmitting assembly, and a hand brake actuating lever directly mounted on said shaft.

3. A disc brake as claimed in claim 2, further comprising means for pivotably mounting said reaction structure for movement about a pivot axis, said rotary shaft having its axis of rotation transverse to and offset from said pivot axis, and said pistons have lines of action extending transversely to the line of action of said thrust transmitting assembly.

4. A disc brake as claimed in claim 2, wherein said thrust transmitting assembly includes two members screw-threaded together and capable of relative rotation, said members having respective screw threads with limited axial clearance therebetween, said screw threads having a first coefficient of friction therebetween when said clearance is taken up in one direction in response to brake actuation, and means providing a second, reduced coefficient of friction between said respective threads when said clearance is taken up in the opposite direction.

5. A disc brake as claimed in claim 2, wherein said pistons are arranged side-by-side, and have lines of action equally spaced from the axis of rotation of said rotary shaft.

6. A disc brake as claimed in claim 5, comprising a second lever directly mounted on said shaft substantially parallel with the hand brake actuating lever, said pistons acting on said respective levers for rotation of said shaft.

7. A disc brake as claimed in claim 5, further comprising a pair of thrust elements each interposed between one of said pistons and said shaft, and adapted to maintain rolling engagement with said piston and shaft, respectively, during rotation of said shaft.

8. A disc brake as claimed in claim 7, wherein said shaft is formed with separate cam portions for engagement by said thrust elements and by said thrust transmitting assembly, respectively.

References Cited

UNITED STATES PATENTS

| | | | |
|---|---|---|---|
| 2,827,132 | 3/1958 | Buyze | 188—73 |
| 2,850,119 | 9/1958 | Peterson | 188—73 |
| 3,236,336 | 2/1966 | Harrison | 188—73 |
| 3,371,749 | 3/1968 | Lucien et al. | 188—106 X |

FOREIGN PATENTS

| | | |
|---|---|---|
| 1,319,419 | 1/1963 | France. |
| 1,488,454 | 6/1967 | France. |

GEORGE E. A. HALVOSA, Primary Examiner

U.S. Cl. X.R.

188—152